US012581377B2

(12) United States Patent
Fan

(10) Patent No.: US 12,581,377 B2
(45) Date of Patent: Mar. 17, 2026

(54) METHOD FOR DETERMINING CANDIDATE TARGET CELL AND TERMINAL DEVICE

(71) Applicant: GUANGDONG OPPO MOBILE TELECOMMUNICATIONS CORP., LTD., Guangdong (CN)

(72) Inventor: Jiangsheng Fan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 364 days.

(21) Appl. No.: 18/325,725

(22) Filed: May 30, 2023

(65) Prior Publication Data

US 2023/0300694 A1 Sep. 21, 2023

Related U.S. Application Data

(63) Continuation of application No. PCT/CN2020/135929, filed on Dec. 11, 2020.

(51) Int. Cl.
*H04W 36/00* (2009.01)
*H04W 36/08* (2009.01)

(52) U.S. Cl.
CPC ..... *H04W 36/00835* (2018.08); *H04W 36/08* (2013.01)

(58) Field of Classification Search
CPC ..................... H04W 36/00835; H04W 36/08
USPC ......................................................... 455/436
See application file for complete search history.

(56) References Cited

U.S. PATENT DOCUMENTS

| | | | | |
|---|---|---|---|---|
| 12,114,216 B2 * | 10/2024 | da Silva | .......... | H04W 36/00838 |
| 12,137,381 B2 * | 11/2024 | Chen | .................... | H04B 7/0617 |
| 2019/0223073 A1 * | 7/2019 | Chen | ................. | H04W 36/0077 |
| 2020/0314914 A1 * | 10/2020 | Roy | .................... | H04B 7/18541 |
| 2021/0022055 A1 * | 1/2021 | Tseng | ................. | H04W 36/362 |
| 2021/0321313 A1 * | 10/2021 | Yan | ..................... | H04W 36/362 |

(Continued)

FOREIGN PATENT DOCUMENTS

| | | |
|---|---|---|
| CN | 111372292 A | 7/2020 |
| CN | 111372293 A | 7/2020 |

(Continued)

OTHER PUBLICATIONS

LG Electronics Inc. (New triggering condition for CHO in NTN; 3GPP TSG-RAN WG2 Meeting #112-e R2-2010579 Online, Nov. 2-Nov. 13, 2020; Agenda item: 8.10.3.3 (NR_NTN_solutions-Core)) (Year: 2020).*

(Continued)

*Primary Examiner* — Khai M Nguyen
(74) *Attorney, Agent, or Firm* — Ladas & Parry LLP

(57) ABSTRACT

A method for determining a candidate target cell and a terminal device are provided in the present disclosure. The method includes determining target configuration information from a plurality of pieces of configuration information stored for conditional handover, wherein the plurality of pieces of configuration information includes at least one piece of historical configuration information, which is acquired from a historical service cell in response to the terminal device accessing to the historical service cell; and determining a cell corresponding to the target configuration information as the candidate target cell, in response to a handover condition corresponding to the target configuration information being met.

20 Claims, 5 Drawing Sheets

(56) References Cited

U.S. PATENT DOCUMENTS

2021/0377831 A1* 12/2021 Yan ................. H04W 36/00838
2022/0060953 A1* 2/2022 Lee .................... H04W 36/362

FOREIGN PATENT DOCUMENTS

CN        111757403 A     10/2020
CN        112020108 A     12/2020
WO    WO-2020164365 A1 *  8/2020  ........ H04W 36/0072

OTHER PUBLICATIONS

LG Electronics Inc:"New triggering condition for CHO in NTN", 3GPP Draft; R2-2010579, 3rd Generation Partnership Project ( 3GPP), Mobile Competence Centre; 650, Route Des Lucioles ; F-06921 Sophia-Antipolis Cedex; France, voi. RAN wG2, No. online; Nov. 2, 2020-Nov. 13, 2020 Oct. 23, 2020 (Oct. 23, 2020), XP052363605.

Lenovo et al: "Conditional handover in NTN", 3GPP Draft; R2-2009859, 3rd Generation Partnership Project (3GPP) , Mobile Competence Centre; 650, Route Des Lucioles ; F-06921 Sophia-Antipolis Cedex; France, vo1. RAN WG2, No. Online; Nov. 2, 2020-Nov. 13, 2020 Oct. 23, 2020 (Oct. 23, 2020), XP052362905.

Interdigital: "Connected mode mobility in NTN", 3GPP Draft; R2-2010454, 3rd Generation Partnership Project ( 3GPP), Mobile Competence Centre; 650, Route Des Lucioles ; F-06921 Sophia-Antipolis Cedex; France, vo1. RAN WG2,No. eMeeting; Nov. 2, 2020-Nov. 13, 2020 Oct. 23, 2020 (Oct. 23, 2020), XP052363493.

European Search Report, European Application No. 20964777.5, mailed Dec. 20, 2023 (10 pages).

3GPP TS 38.331 V16.2.0 (Sep. 2020), 3rd Generation Partnership Project; Technical Specification Group Radio Access Network;NR-;Radio Resource Control (RRC) protocol specification(Release 16).

3GPP TS 38.321 V16.2.1 (Sep. 2020), 3rd Generation Partnership Project; Technical Specification Group Radio Access Network;NR;Medium Access Control (MAC) protocol specification(Release 16).

3GPP TS 38.211 V16.3.0 (Sep. 2020), 3rd Generation Partnership Project; Technical Specification Group Radio Access Network;NR;Physical channels and modulation(Release 16).

Ericsson"Conditional Handover Execution in LTE", 3GPP TSG RAN WG2 #106, R2-1906197, May 2, 2019.

International Search Report, International Application No. PCT/CN2020/135929, mailed Aug. 26, 2021 (13 pages).

* cited by examiner

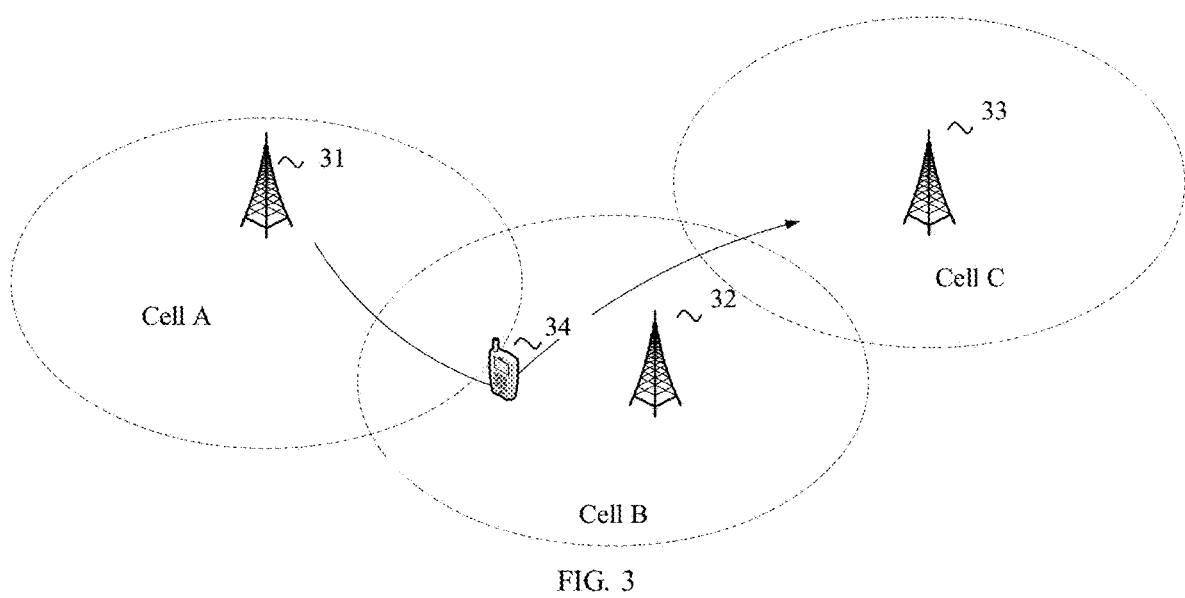

FIG. 3

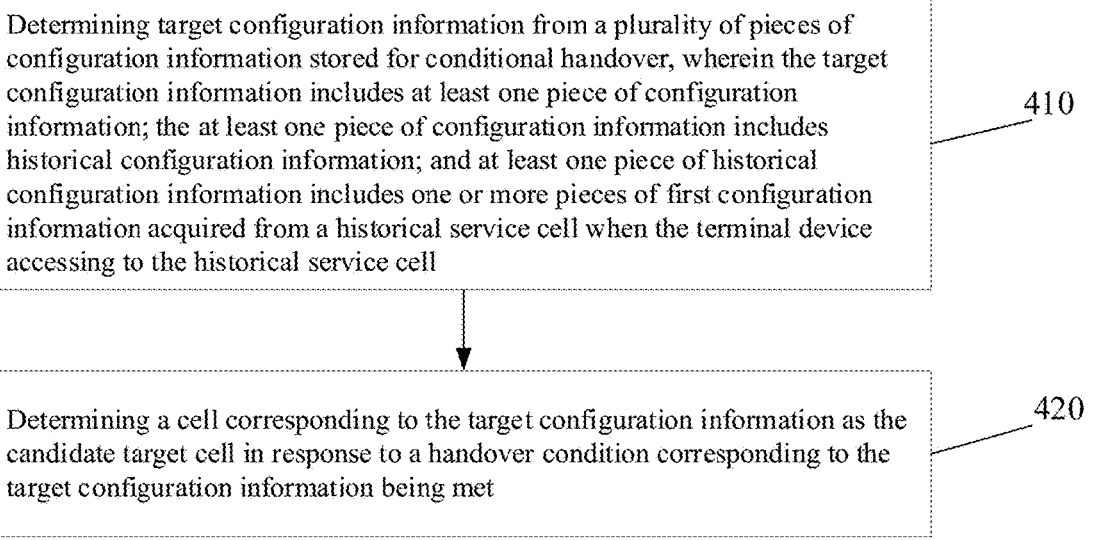

Determining target configuration information from a plurality of pieces of configuration information stored for conditional handover, wherein the target configuration information includes at least one piece of configuration information; the at least one piece of configuration information includes historical configuration information; and at least one piece of historical configuration information includes one or more pieces of first configuration information acquired from a historical service cell when the terminal device accessing to the historical service cell    410

Determining a cell corresponding to the target configuration information as the candidate target cell in response to a handover condition corresponding to the target configuration information being met    420

FIG. 4

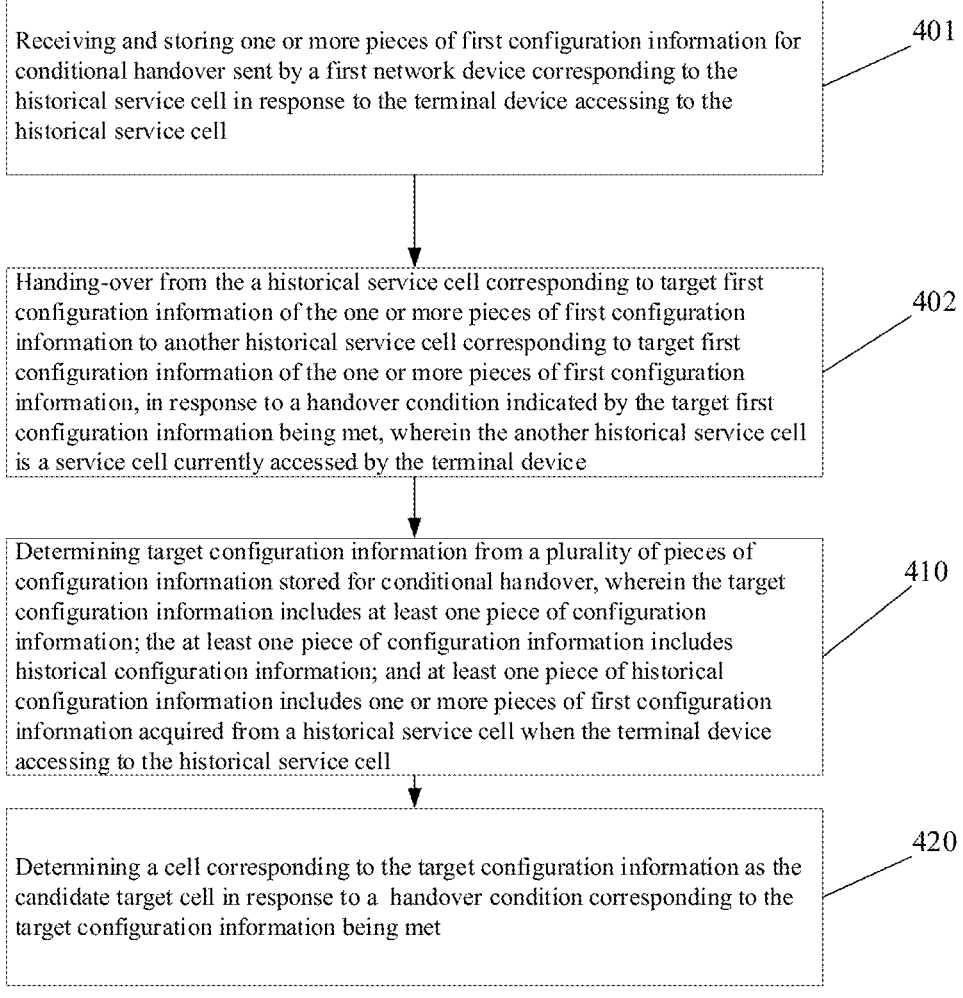

Receiving and storing one or more pieces of first configuration information for conditional handover sent by a first network device corresponding to the historical service cell in response to the terminal device accessing to the historical service cell ⟋401

Handing-over from the a historical service cell corresponding to target first configuration information of the one or more pieces of first configuration information to another historical service cell corresponding to target first configuration information of the one or more pieces of first configuration information, in response to a handover condition indicated by the target first configuration information being met, wherein the another historical service cell is a service cell currently accessed by the terminal device ⟋402

Determining target configuration information from a plurality of pieces of configuration information stored for conditional handover, wherein the target configuration information includes at least one piece of configuration information; the at least one piece of configuration information includes historical configuration information; and at least one piece of historical configuration information includes one or more pieces of first configuration information acquired from a historical service cell when the terminal device accessing to the historical service cell ⟋410

Determining a cell corresponding to the target configuration information as the candidate target cell in response to a handover condition corresponding to the target configuration information being met ⟋420

FIG. 5

Sending first indication information to a terminal device, wherein the first indication information is configured to indicate the terminal device to continue to store the at least one of pieces of historical configuration information after a successful handover, the at least one of pieces of historical configuration information being acquired from the historical service cell ⟋610

FIG. 6

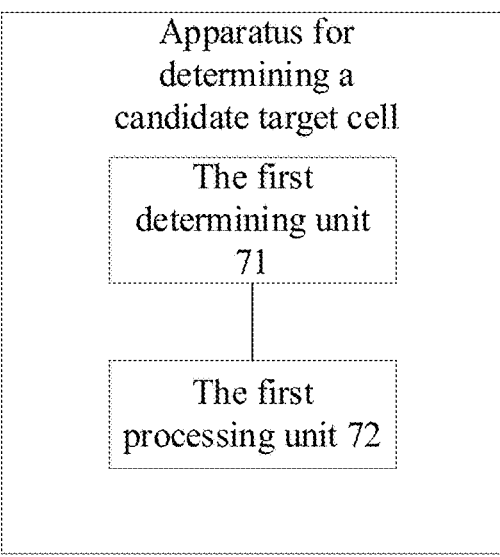
FIG. 7
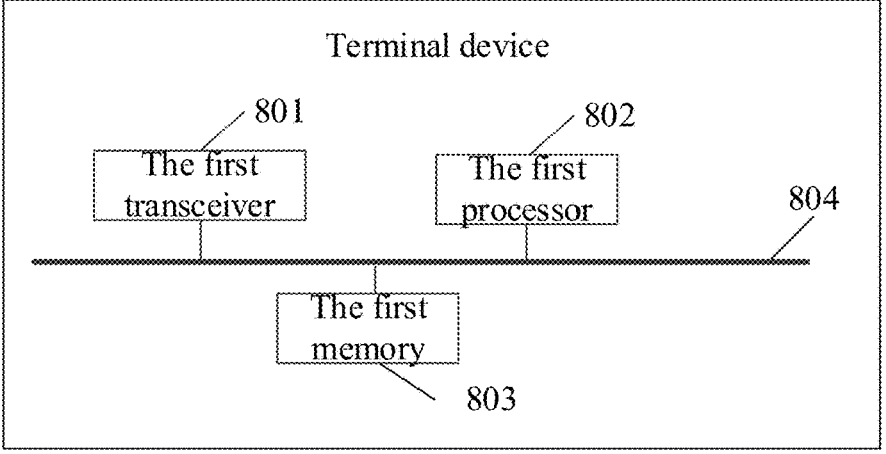
FIG. 8
Apparatus for
determining a
candidate target cell
The second
sending unit 91
FIG. 9

METHOD FOR DETERMINING CANDIDATE TARGET CELL AND TERMINAL DEVICE

CROSS REFERENCE

The present disclosure is a continuation application of International Patent Application No. PCT/CN2020/135929, filed on Dec. 11, 2020, the entire contents of which are incorporated herein by reference in its entirety.

TECHNICAL FIELD

The present disclosure relates to the technical field of communication, in particular to a method for determining a candidate target cell, an apparatus, a terminal, a computer device, and a computer storage medium.

BACKGROUND

In a communication system, a network device keeps continuity of communication service of a terminal device by a handover (HO) process, i.e., a communication message of the terminal device is switched from a source network device to a target network device as smoothly as possible.

At present, the terminal device requires to acquire a handover command from a network side before each cell handover, which wastes control channel resources of the communication system and is not conducive to power saving of the terminal device. If the number of terminal devices performing cell handover at the same time is too large (e.g., LEO satellite handover), the problem of control channel resource congestion will arise, and more seriously, some terminal devices may lose network coverage due to the loss of handover commands.

SUMMARY OF THE DISCLOSURE

In a first aspect, some embodiments in the present disclosure provide a method for determining a candidate target cell, applied in a terminal device, including:

determining target configuration information from a plurality of pieces of configuration information stored for conditional handover, wherein the plurality of pieces of configuration information comprises at least one piece of historical configuration information, which is acquired from a historical service cell in response to the terminal device accessing to the historical service cell;

determining a cell corresponding to the target configuration information as the candidate target cell, in response to a handover condition corresponding to the target configuration information being met.

In a second aspect, some embodiments in the present disclosure provide a method for determining a candidate target cell, applied in a second network device, including:

sending first indication information to a terminal device, wherein the first indication information is configured to indicate the terminal device to continue to store at least one piece of historical configuration information after a successful handover, the at least one piece of historical configuration information being acquired from a historical service cell;

wherein target configuration information is determined from a plurality of pieces of configuration information stored for conditional handover by the terminal device, wherein the plurality of pieces of configuration information comprises the at least one piece of historical configuration information, which is acquired from the historical service cell in response to the terminal device accessing to the historical service cell; and a cell corresponding to the target configuration information is determined as the candidate target cell in response to a handover condition corresponding to the target configuration information being met.

In a third aspect, some embodiments in the present disclosure provide a terminal device, including a first transceiver, a first processor, and a first memory storing a computer program, wherein the first transceiver, the first processor, and the first memory are communicated with each other through a first communication bus; the first processor is configured to communicated with a network device through the first transceiver; the first processor is further configured to perform the method in the first aspect in conjunction with the first transceiver, when running the computer program stored in the first memory.

BRIEF DESCRIPTION OF THE DRAWINGS

FIG. 3 is a schematic view of a communication system architecture provided in some embodiments of the present disclosure.

FIG. 4 is a first flow chart of a method for determining a candidate target cell provided in some embodiments of the present disclosure.

FIG. 5 is a second flow chart of a method for determining a candidate target cell provided in some embodiments of the present disclosure.

FIG. 6 is a third flow chart of a method for determining a candidate target cell provided in some embodiments of the present disclosure.

FIG. 7 is a first structural composition schematic of an apparatus for determining a candidate target cell provided in some embodiments of the present disclosure.

FIG. 8 is a second structural composition schematic of an apparatus for determining a candidate target cell provided in some embodiments of the present disclosure.

FIG. 9 is a hardware structural composition schematic of a terminal device provided in some embodiment of the present disclosure.

DETAILED DESCRIPTION

To make the purpose, technical solutions, and advantages of the present disclosure clear, the embodiments of the present disclosure will be further completely described below in conjunction with the accompanying drawings. The accompanying drawings are for illustrative purposes only and are not intended to limit the embodiments of the present disclosure.

It should be noted that the terms "first", "second", etc. in the specification and claims of the present disclosure and the accompanying drawings above are used to distinguish between different objects and are not intended to describe a particular order. In addition, the terms "comprising" and "having", and any variations thereof, are intended to cover a non-exclusive inclusion. For example, a process, method, system, product, or apparatus that includes a series of steps or units is not limited to the listed steps or units, but optionally also includes steps or units that are not listed, or optionally also includes other steps or units that are inherent to those processes, methods, products, or apparatus.

The New Radio (NR) system, supported by the fifth generation of communication mobile communications (5th Generation, 5G), is similar to the Long Term Evolution (LTE) system in that it supports the handover process. When a terminal device that is using a network service moves from one cell to another, or due to wireless transmission service load adjustment, activation operation maintenance, equipment failure, etc., the system requires to transfer communication link between the terminal device and the source cell to a new cell (i.e., the target cell), i.e., perform the handover process, in order to ensure the continuity of communication and service quality.

Figure 1:
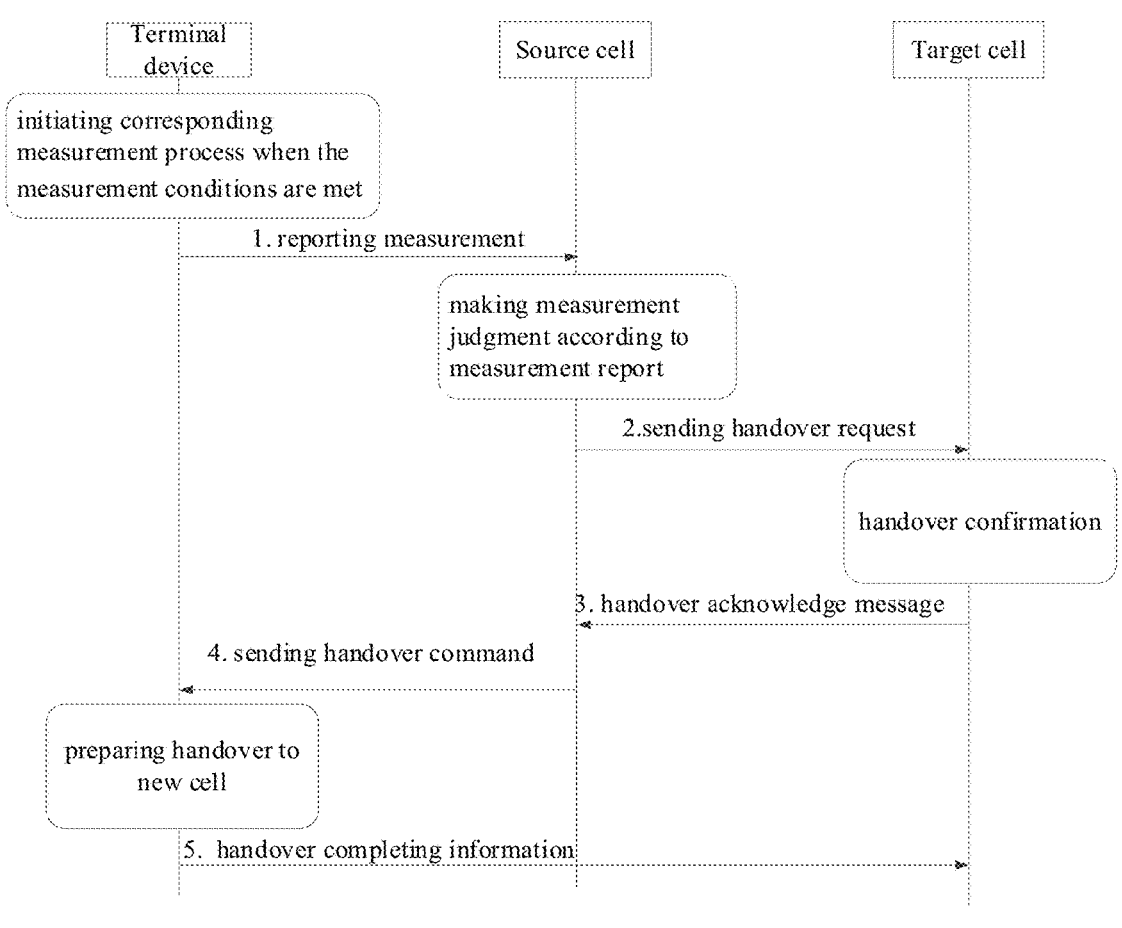
FIG. 1 is a flow chart of conventional handover provided in some embodiments of the present disclosure.

Referring to the flow chart shown in FIG. 1, the handover process of the terminal device is divided into the following operations:

At step 1, after receiving measurement configuration from the network side, the terminal device initiates a corresponding measurement process when the measurement conditions are met, and then reports measurement results to the network side according to the measurement reporting configuration after completing the measurement.

At step 2, after receiving the measurement report from the terminal device, the network side makes a handover judgment according to local rules, a source cell determines one or several target cells after the judgment, and then the source cell sends a handover request message to a target cell.

At step 3, after receiving the handover request sent by the source cell, the target cell determines whether the handover request may be accepted according to local load and other information, and responses a handover acknowledge message information to the source cell if the handover request can be accepted.

At step 4, after the source cell receives the handover acknowledge message sent by the target cell, the source cell forwards configuration information to the corresponding terminal in the form of a pass-through.

At step 5, the terminal applies the configuration information in the handover command immediately after receiving the handover command and initiates an access process to the target cell for handover.

In response to the problem of frequent handover and easy failure of handover in high-speed mobile scenarios and high-frequency deployment scenarios, the 3rd Generation Partnership Project (3GPP) organization introduces Conditional Handover (CHO)/Conditional Synchronous Reassignment mechanism in the NR R16 mobility enhancement project. It should be noted that the concepts of Conditional Handover and Conditional Synchronous Reassignment are the same, and no distinction is made between them in the embodiments of the present disclosure.

The general idea of the CHO/Conditional Synchronous Reassignment mechanism is that the network side sends configuration information for conditional handover to the terminal device in advance; the terminal device does not initiate a access process to a target cell immediately after receiving the configuration information for conditional handover as that in the conventional handover mechanism, but saves the configuration information for conditional handover first, until a condition in the configuration information for conditional handover are met by a signal in the target cell. One handover command allows to configure configuration information of one or more target cells.

Figure 2:
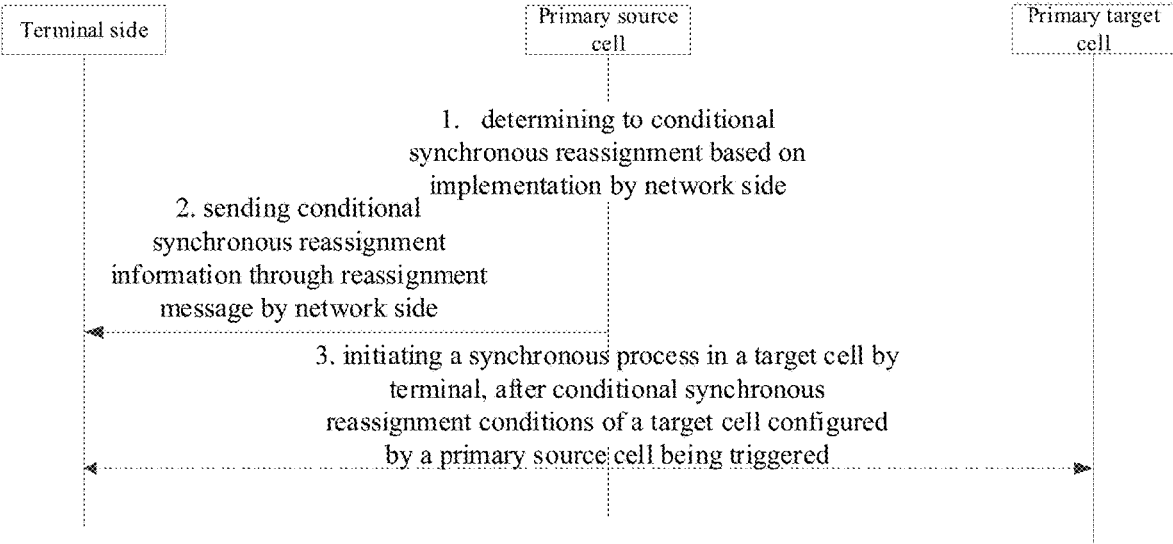
FIG. 2 is a flow chart of conditional handover provided in some embodiments of the present disclosure.

Specifically, referring to the flow chart shown in FIG. 2, the basic CHO process is as follows:

At step 1, the network side control mobility of the terminal device with a conditional handover mechanism based on implementation.

At step 2, the network side configures conditional handover configuration information of one or more target cells for the terminal device through handover information.

At step 3, when a trigger condition included in any of the stored conditional handover configuration information of the terminal device are met, the terminal device initiates a handover access process with the corresponding target cell, and once the terminal device is accessed to the target cell, the terminal device immediately deletes any previously stored conditional handover configuration information.

It may be seen that once the existing conditional handover mechanism is successfully executed, the terminal device will immediately delete any previously stored conditional handover configuration information, resulting in the terminal device having to acquire new conditional handover configuration information from the network side again before each cell handover. This will waste control channel resources of the communication system and is also not conducive to power saving of the terminal device. Moreover, if the number of terminals to handover at the same time is too large (such as LEO satellite handover), it will further increase the problem of system control channel resource congestion, and in more serious cases, it will lead to the loss of network coverage of some terminal devices due to the loss of conditional handover configuration information.

Based on the above, a method for determining a candidate target cell in the embodiments of the present disclosure is provided. Specifically, the terminal device determines target configuration information from multiple pieces of configuration information stored for conditional handover; the target configuration information includes at least one piece of multiple pieces of configuration information; the at least one piece of configuration information includes historical configuration information; and the at least one piece of historical configuration information includes one or more pieces of first configuration information acquired from a historical service cell in response to the terminal device accessing to the historical service cell. A cell corresponding to the target configuration information is determined as the candidate target cell in response to a handover condition corresponding to the target configuration information being met. In other words, the terminal device may save configuration information acquired from historical service cells for conditional handover; and the terminal device may use the historical configuration information for cell handover when it performs cell handover each time, so that the network side only configures the configuration information once and the terminal device may use the configuration information multiple times; and the terminal device does not have to acquire the configuration information for conditional handover from the network side before each handover, thereby saving the overhead of handover signaling and reducing the power consumption of the terminal device.

FIG. 3 is a schematic view of a communication system architecture provided in some embodiments of the present disclosure. As shown in FIG. 3, the communication system architecture provided in the embodiments of the present application includes at least three cells, for example, cell A belonging to a network device 31, cell B belonging to network device 32, and cell C belonging to network device 33.

In a process of moving from cell A to cell B, the terminal device 34 switches from cell A to cell B. It is understood that cell A is a historical service cell of the terminal device 34, and cell B is a current service cell accessed by the terminal device 34. The terminal device 34 may switch from cell B to cell C as it continues to move from cell B to cell C. That is, cell C may be the target cell of the terminal device.

It is noted that in some embodiments of the present disclosure, a network device may have one or more cells. In some embodiments of the present disclosure, cell A, cell B, and cell C may belong to the same network device, that is, network device 31, network device 32, and network device 33 may be the same network device. In this case, the terminal device 34 performs handover within the network device.

Alternatively, cell A, cell B, and cell C may also belong to different network devices, that is, network device 31, network device 32, and network device 33 may be different network devices. In this case, the terminal device 34 performs handover among network devices.

It should be understood that the communication system in some embodiments of the present disclosure may be various communication systems, such as a Global System for Mobile Communications (GSM) system, a Code Division Multiple Access (CDMA) system, a Wideband Code Division Multiple Access (WCDMA) system, General Packet Radio Service (GPRS), LTE system, LTE Frequency Division Duplex (FDD) system, LTE Time Division Duplex (TDD) system, Universal Mobile Telecommunication system (UMTS), Worldwide Interoperability for Microwave Access (WiMAX) communication system, NR system, etc.

The terminal device 34 may also be referred to as user equipment (UE), access terminal, user unit, user station, mobile station, mobile station, remote station, remote terminal, mobile device, user terminal, terminal, wireless communication device, user agent, or user device. The access terminal may be a cellular telephone, a cordless telephone, a Session Initiation Protocol (SIP) telephone, a Wireless Local Loop (WLL) station, a Personal Digital Assistant (PDA), a handheld device with Wireless communication-enabled handheld devices, computing devices or other processing devices connected to wireless modems, in-vehicle devices, wearable devices, drone devices, and terminal devices in 5G networks or in future evolved Public Land Mobile Networks (PLMNs), etc., which are not limited by the embodiments of the present disclosure.

In addition, the network device in some embodiments of the present disclosure may also be called an access network device, which may be a base station (Base Transceiver Station, BTS) in a GSM system or CDMA system, or a base station (NodeB, NB) in a WCDMA system, an evolved base station (evolved NodeB, eNB or eNB) in an LTE system, or a wireless controller in a Cloud Radio Access Network (CRAN) scenario, or the network device may be a repeater station, access point, in-vehicle device, wearable device, and network device in a 5G network or in a future evolved PLMN network, etc. For example, a transmission point (TRP or TP) in an NR system, a base station (gNB) in an NR system, an antenna panel or a group of antenna panels (including multiple antenna panels) of a base station in a 5G system, etc., which are not limited by the embodiments of the present disclosure.

The technical solutions in some embodiments of the present disclosure will be clearly and completely described below in conjunction with the accompanying drawings in some embodiments of the present disclosure.

Some embodiments of the present disclosure provide a method for determining a candidate target cell applied in a terminal device 34 in the communication system architecture shown in FIG. 3. Referring to the flow chart shown in FIG. 4, the method for determining a candidate target cell may include operations at block 410 and 420.

At block 410, the terminal device determines target configuration information from a plurality of pieces of configuration information stored for conditional handover.

The target configuration information includes at least one piece of historical configuration information; the at least one piece of historical configuration information includes one or more pieces of first configuration information acquired from a first cell when the terminal device accesses to the first cell; the first cell is a historical service cell for the terminal device. That is to say, as the target configuration information is determined from the plurality of pieces of configuration information stored for conditional handover, the plurality of pieces of configuration information includes at least one piece of historical configuration information, which is acquired from a historical service cell in response to the terminal device accessing to the historical service cell.

The conditional handover herein refers to a handover process performed by the terminal device when a certain handover condition is met. Configuration information for conditional handover may configure a measurement object for the terminal device to perform cell handover and a handover condition that is to be met.

It should be noted that the measurement object may be frequency information, such as frequency points. In practice, the frequency points may represent cells. That is, a piece of configuration information may correspond to a cell. In addition, the handover condition may include a condition threshold or multiple condition thresholds, which is not limited in the embodiments of the present disclosure.

A plurality of pieces of configuration information for conditional handover may be stored in the terminal device. Here, the plurality of pieces of configuration information may include configuration information obtained by the terminal device from the current service cell, and may also include historical configuration information acquired by the terminal device from a historical service cell.

Here, the plurality of pieces of configuration information may be stored in the terminal device using a list or may be stored in the terminal device by means of an array, which is not limited in the embodiments of the present disclosure.

In some implementations of the present disclosure, referring to Table 1, the terminal device may store the acquired multiple pieces of configuration information by means of a list of configuration information.

TABLE 1

| list of Configuration information | | | |
|---|---|---|---|
| corner mark 0 | corner mark 1 . . . . . . | corner mark (N-2) | corner mark (N-1) |
| configuration information 0 | configuration information 1 . . . . . . | configuration information (N-2) | configuration information (N-1) |

N in Table 1 is a positive integer greater than or equal to 1. The corner marks in Table 1 are used to identify different configuration information.

The terminal device selects target configuration information from the stored plurality of pieces of configuration information before performing cell handover and performs cell handover based on this target configuration information by means of conditional handover. That is, the terminal device may activate the target configuration information from the plurality of pieces of configuration information and use the target configuration information for cell handover.

Here, the target configuration information selected by the terminal device may include one or more historical configuration information acquired by the terminal device from historical service cells. In other words, the network side may configure configuration information only once, while the terminal device may use the configuration information for multiple times. In this way, the control channel resources of the communication system are saved.

It is understood that the terminal device may not have to obtain handover commands from the network side before performing cell handover, but select one or more historical configuration information from the stored multiple pieces of configuration information for cell handover.

The terminal device may determine the target configuration information from the plurality of pieces of configuration information based on dynamic indications from the network side. The terminal device may also determine the target configuration information from the plurality of pieces of configuration information based on a pre-configured activation condition from the network side. The terminal device may also determine the target configuration information from the plurality of pieces of configuration information in a way of autonomous judgment, This is not limited in the embodiments of the present disclosure.

At block 420, the terminal device determines that a cell corresponding to the target configuration information is a candidate target cell if a handover condition corresponding to the target configuration information is met.

The terminal device may perform conditional handover based the target configuration information after selecting the target configuration information. Specifically, the terminal device may measure a measurement object configured in the target configuration information and then obtain a measurement result. When the measurement result of the measurement object meets the handover condition corresponding to the target configuration information, the cell corresponding to the target configuration information is set as the candidate target cell.

In some embodiments of the present disclosure, the target configuration information includes only one piece of historical configuration information, in which case the terminal device may directly measure a measurement object in the historical configuration information, and a cell corresponding to the historical configuration information is set as a candidate target cell when the measurement result meets a handover condition corresponding to the historical configuration information.

In another some embodiment, the target configuration information includes multiple pieces of historical configuration information, in which case the terminal device may separately measure measurement objects in the multiple pieces of historical configuration information. A cell corresponding to the historical configuration information whose measurement result meets the handover condition is set as a candidate target cell.

Further, when there is only one candidate target cell, the terminal device may directly initiate an access process to the cell. When there are multiple candidate target cells, the terminal device may choose any one cell to initiate an access process or may select one of the multiple cells for access according to a certain rule.

In some embodiments, the target configuration information may also be configured with no handover condition, so that the terminal device may immediately initiate an access process to the cell corresponding to the target configuration information after activating the target configuration information.

It may be seen that the terminal device may store configuration information acquired from historical service cells for conditional handover. The terminal device may use the historical configuration information for cell handover each time it performs cell handover, so that the network side only configures configuration information once, and the terminal device may use the configuration information for multiple times. Further, the terminal device may use historical configuration information, which means that the terminal device does not need to obtain configuration information from the network side before each handover. This saves handover signaling overhead and reduces power consumption of the terminal device.

Based on the afore-mentioned embodiments, considering that the terminal device will delete previously acquired configuration information for conditional handover after successful cell handover. To ensure forward compatibility of the terminal device, the network device may send first indication information to the terminal device indicating the terminal device not to delete the previously received configuration information.

Specifically, the method may further include the following operation before the determining target configuration information from a plurality of pieces of configuration information stored for conditional handover at block 410.

At block 400, the terminal device receives first indication information, wherein the first indication information is configured to indicate the terminal device to continue to store at least one piece of historical configuration information after a successful handover.

In other words, with first indication information, the network side may indicate the terminal device to continue to store one or more previously stored configuration information for conditional handover after a successful legacy handover or conditional handover.

The first indication information is carried by a system broadcast message or dedicated signaling.

In other words, the network side indicates the terminal to still store one or more previously stored configuration information after the successful legacy handover or conditional handover through a system broadcast message or dedicated signaling.

It should be noted that the first indication information may be sent by a network device corresponding to the service cell currently accessed by the terminal device, or by a network device corresponding to any historical service cell of the terminal device, which is not limited in the embodiments of the present disclosure.

Here, the system broadcast message may be a Master Information Block (MIB) or a System Information Block (SIB).

Specifically, the first indication information may be carried via SIB1 or other SIBs (e.g., SIB2~SIB11). When the first indication information is carried via other SIBs, the network side may send it in an on-demand broadcast mode or in a continuous broadcast mode.

Alternatively, the dedicated signaling may be a newly defined signaling dedicated for sending the first indication information.

The dedicated signaling may indicate the terminal device to continue to store the plurality of pieces of configuration information in following ways.

In the first way, a first bit in the dedicated signaling is used to indicate the terminal device to continue to store all previously stored configuration information after a successful handover.

Here, the first bit may be any one of bits in the dedicated signaling.

Exemplarily, when the first bit in the dedicated signaling is set with a value of 0, 1, or Boolean value, the terminal device is indicated to continue to store all previously stored configuration information even after a successful handover.

In the second way, a second bit in the dedicated signaling indicates the terminal device to continue to store all configuration information except configuration information corresponding to a specific cell even after a successful handover.

Here, the second bit may be any bit in the dedicated signaling, and the second bit may be the same or different from the first bit, which is not limited in the embodiments of the present disclosure.

In addition, the specific cell refers to a cell accessed by the terminal device after successful handover. It is understood that the terminal device may use the conditional handover configuration information of the specific cell to switch to the specific cell successfully, so that the conditional handover configuration information corresponding to the specific cell may be deleted to ensure accuracy of cell handover for the terminal device.

Exemplarily, when the second bit is set with a value of 0, 1, or Boolean value, it indicates that the terminal device needs to continue to store all previously stored configuration information except that corresponding to the specific cell even after a successful handover.

In the third way, it is indicated through a bit pattern mapping including multiple bits in the dedicated signaling.

Specifically, each bit of the plurality of bits corresponds to one piece of configuration information stored by the terminal device, and a bit may correspond to configuration information by a logical order in which the configuration information is received. As the bit is set, for example, with a value of 0, 1, or Boolean value, it indicates that the configuration information corresponding to the bit needs to continue to be stored after a successful handover of the terminal device.

Exemplarily, referring to Table 2, N pieces of configuration information in Table 1 may be indicated by N bits. N is a positive integer greater than or equal to 1.

In some implementations, bit 1 in Table 2 corresponds to corner mark 0 in Table 1, bit 2 in Table 2 corresponds to corner mark 1 in Table 1, and so on. Thus, the terminal device is indicated to continue to store the configuration information indicated by corner mark 0 after a successful cell handover as the bit 1 is set with a value of 0 or 1. That is, the terminal device is indicated not to delete the configuration information indicated by corner mark 0 after a successful cell handover.

In another some implementations, bit 1 in Table 2 corresponds to the corner mark (N−1) in Table 1, bit 2 in Table 2 corresponds to the corner mark (N−2) in Table 1, and so on. Thus, the terminal device is indicated to continue to store the configuration information indicated by the corner marker (N−1) after a successful cell handover as the bit 1 is set with a value of 0 or 1. That is, the terminal device is indicated not to delete the configuration information indicated by the corner marker (N−1) after a successful cell handover.

TABLE 2

| Bit pattern mapping | | | | |
|---|---|---|---|---|
| Bit 1 | Bit 2 | . . . . . . | Bit (N-1) | Bit N |

In the fourth way, similar to that in the third way, it is indicated by a bit pattern mapping including several bits in the dedicated signaling.

What differs from that in the third way is that, the number of bits contained in the bit pattern in the fourth way is one less than that contained in the third way, because the configuration information of a cell accessed by the terminal device after a successful handover must be deleted. At this time, the remaining configuration information stored by the terminal device forms a new list of configuration information, and the logical order among elements of the list of configuration information remains unchanged. Each element of the list corresponds to one bit in the bit pattern received by the terminal device, in which correspondence relationship is similar to that in the third way, which will not repeat herein.

As it may be seen, configuration information may be stored under indication of the network side. Thus, the network device may indicate the terminal device to store historical configuration information in the case of a lack of control channel resources, and then the terminal device may perform cell handover based on the historical configuration information, thereby improving flexible configuration of cell handover.

Based on the preceding embodiment, in some embodiments of the present disclosure, referring to the flow chart shown in FIG. 5, the following operation may also be performed before determining target configuration information from a plurality of pieces of configuration information stored for conditional handover at block 410.

At block 401, the terminal device receives and stores one or more pieces of first configuration information for conditional handover sent by a first network device corresponding to the first cell in response to the terminal device accessing to the first cell.

At block 402, the terminal device hands over from the first cell to a second cell corresponding to target first configuration information of the first configuration information, in response to a handover condition indicated by the target first configuration information being met.

Here, the second cell may be the service cell currently accessed by the terminal device.

That is, the terminal device may acquire the first configuration information for conditional handover from the first network device when accessing the first cell, and the terminal device may store the acquired first configuration information. In other word, the terminal device receives and stores at least one piece of historical configuration information for conditional handover sent by the first network device, in response to the terminal device accessing to a historical service cell corresponding to the at least one piece of historical configuration information, and the terminal device handovers from the historical service cell to the service cell currently accessed by the terminal device, in response to a handover condition indicated by the target first configuration information being met.

Specifically, after accessing the first cell, the terminal device may measure network environment and report the measurement results. After receiving the measurement results, the first network device selects one or more neighboring cells based on the measurement results reported by the terminal device and sends a pre-handover request to a network device corresponding to the neighboring cell. When the network device corresponding to the neighboring cell accepts the request, it allocates data transmission resources for the terminal device and sends the first configuration information of the neighboring cell to the first network device at the same time, such that the first network device forwards the first configuration information to the terminal device.

The first network device may send the first configuration information to the terminal device through Radio Resource Control (RRC) connection reconfiguration information.

Further, the terminal device may also perform conditional handover based on the received first configuration information. Specifically, the terminal device may measure measurement objects included in the first configuration information, and select a target first configuration information, in which a handover condition is met, from the first configuration information. Here, the target first configuration information corresponds to the second cell. In this way, the terminal device initiates an access process to the second cell.

After successfully accessing to the second cell, the terminal device does not delete the plurality of pieces of first configuration information acquired from the first cell. In this way, when handing-over from the second cell to other cells, the terminal device may directly use the plurality of pieces of first configuration information stored by the terminal device for cell handover, without receiving any handover command from the network device corresponding to the second cell. Therefore, the terminal device does not have to acquire configuration information for conditional handover from the network side before each handover, saving handover signaling overhead and reducing power consumption of the terminal device.

In some embodiments of the present disclosure, for determining the target configuration information from the stored plurality of pieces of configuration information for conditional handover at block 410, there are a plurality of ways. That is, there is a plurality of ways to activate the target configuration information, and two activation ways are described in detail below.

First Activation Way

In some implementations, determining the target configuration information from the stored plurality of pieces of configuration information for conditional handover at block 410 may be achieved by the following operations.

At block 4101, the terminal device receives second indication information sent by a second network device, wherein the second indication information is configured to indicate at least one piece of configuration information in the plurality of pieces of configuration information for conditional handover.

Here, at least one piece of configuration information includes historical configuration information and the second network device is a network device corresponding to a service cell currently accessed by the terminal device.

At block 4102, the terminal device determines the at least one piece of configuration information indicated by the second indication information as the target configuration information.

It is understood that the terminal device may select one or more historical configuration information from the plurality of pieces of configuration information as the target configuration information based on the indication of the current service cell. Specifically, the second network device may dynamically indicate the terminal device configuration information to be activated based on the network environment in which the terminal device is located or the location of the terminal device.

In some embodiments of the present disclosure, the second indication information may be carried in one of a Radio Resource Control (RRC) signaling, a Media Access Control (MAC) control element (CE), MAC sub header format, and a Downlink Control Information (DCI) format.

In some implementations, the second indication information may be carried in an RRC signaling That is, the network side indicates the configuration information to be activated by the terminal device through the RRC signaling.

Specifically, the RRC signaling is used to indicate the configuration information to be activated by the terminal device, which may have the following forms.

Form 1a: a bit mapping pattern including multiple bits in the RRC is used to indicate the configuration information to be activated by the terminal device.

Specifically, similar to the bit mapping logic of the bit pattern shown in Table 2, a bit corresponds to one piece of configuration information in the list of configuration information. The second network device may set a particular bit in the RRC signaling, for example, with a value of 0, 1, or Boolean value, to indicate activation of the configuration information corresponding to the bit.

Form 2a: a corner mark carried in the RRC signaling is used to indicate the configuration information to be activated.

In some embodiments of the present disclosure, referring to the list of configuration information shown in Table 1, one piece of configuration information corresponds to one corner mark of the list. The second network device may carry the corner mark corresponding to the configuration information to be activated in the RRC signaling and send to the terminal device. In this way, after receiving the RRC signaling, the terminal device mays parse the corner mark carried in the RRC signaling and activate corresponding configuration information based on the corner mark.

Form 3a: a frequency point and Physical Cell Identity (PCI) information, or Cell Global Identity (CGI) information carried in the RRC signaling is used to indicate the configuration information to be activated.

A piece of configuration information may correspond to a cell, i.e., the piece of configuration information may include information representing the cell, which may the frequency and the PCI information of the cell or the CGI information of the cell.

Specifically, the second network device may carry the frequency and PCI information corresponding to the configuration information to be activated, or the CGI information in the RRC signaling and send to the terminal device. Thus, after receiving the RRC signaling, the terminal device may obtain the frequency and PCI, or CGI information from the RRC signaling and activate corresponding configuration information based on the frequency and PCI, or CGI information.

In another some implementations, the second indication information may be carried in the MAC CE or MAC sub header format, i.e., the network side indicates the configuration information to be activated by the terminal device through the newly defined MAC CE or MAC sub header format.

Specifically, the MAC CE or MAC sub header format is used to indicate the configuration information to be activated by the terminal device, which may have the following forms:

Form 1b: a bit mapping pattern including multiple bits in the MAC CE or MAC sub header format is used to indicate the configuration information to be activated.

Specifically, similar to the bit mapping logic of the bit pattern shown in Table 2, a bit corresponds to a piece of configuration information in the list of configuration information, and the second network device may set a specific bit in the MAC CE or MAC sub header format, for example, with a value of 0, 1, or a Boolean value, to indicate activation of the configuration information corresponding to the bit.

Form 2b: multiple bits in the MAC CE or MAC sub header format are combined to indicate the configuration information to be activated.

Here, the second network device may represent a corner mark by a plurality of bits included in the newly defined MAC CE or MAC sub header. For example, three bits may indicate eight corner marks. In this way, the terminal device may determine a corner mark based on the plurality of bits included in the received MAC CE or MAC sub header, and thus know which configuration information to subsequently activate.

In yet another some implementations, the second indication information may be carried in the DCI format carried by the Physical Downlink Control Channel (PDCCH). That is, the network side indicates the configuration information to be activated by the terminal device through a newly defined DCI format carried by the PDCCH.

Specifically, the DCI format carried by the PDCCH is used to indicated the configuration information to be activated by the terminal device, which may have the following forms.

Form 1c: a bit mapping pattern including a plurality of bits in the DCI format is used to indicated the configuration information to be activated.

Specifically, similar to the bit mapping logic of the bit pattern shown in Table 2, a bit corresponds to a piece of configuration information in the list of configuration information, and the second network device may set a particular bit in the DCI format, for example, with a value of 0, 1, or a Boolean value, to indicate activation of the configuration information corresponding to the bit.

Form 2c: multiple bits in the DCI format are combined to indicate the configuration information to be activated.

Here, the second network device may represent a corner mark by a plurality of bits contained in the newly defined DCI carried by the PDCCH. For example, three bits may indicate eight corner marks. In this way, the terminal device may determine a corner mark based on the bits included in the received MAC CE or MAC sub header, and thus know which configuration information to subsequently activate.

Thus, it may be seen that in some embodiments of the present disclosure, the network side may dynamically indicate the configuration information to be activated by the terminal device, improving the flexibility of cell handover.

Second Activation Way

In some implementations, determining target configuration information from a plurality of pieces of configuration information stored for conditional handover at block 410 may be achieved by the following operations.

At block 4101', the terminal device monitors a relevant parameter of second configuration information, wherein the second configuration information is any one of the plurality of pieces of configuration information for conditional handover.

At block 4102', the terminal device determines the second configuration information as the target configuration information, in response to the relevant parameter of the second configuration information meeting an activation condition corresponding to the second configuration information.

That is, the terminal device may select configuration information that meets the activation condition from a plurality of pieces of configuration information according to the pre-set activation condition. Here, each configuration information may have its corresponding activation condition, where the activation condition corresponding to each configuration information may be configured by the network device or set by the terminal device according to the actual requirements, which is not limited in the embodiments of the present disclosure.

In some embodiments of the present disclosure, the activation condition corresponding to the second configuration information include at least one of a duration during which the second configuration information is received by the terminal device being greater than a first duration; a signal quality of a service cell currently accessed by the terminal device, and/or, a signal quality of a third cell meeting a first condition, the third cell corresponding to the second configuration information; a first distance between the terminal device and the third cell, and/or, a second distance between the terminal device and the service cell currently accessed by the terminal device meeting a second condition; and a third distance between the terminal device and a satellite corresponding to the third cell, and/or, a fourth distance between the terminal device and a satellite corresponding to the service cell currently accessed by the terminal device meeting a third condition.

In some embodiments, for the first item of the above activation condition, an activation timer or a first Coordinated Universal Time (UTC) may be configured to detect the duration during which the terminal device receives the second configuration information. The terminal device may activate the second configuration information when the activation timer times out or the first UTC arrives.

In some embodiments, for the second item of the above activation condition, the terminal device may measure the signal quality of the service cell in real time, as well as the signal quality of the third cell corresponding to the second configuration information. For example, parameters such as Reference Signal Receiving Power (RSRP), Reference Signal Receiving Quality (RSRQ), or Signal to Interference plus Noise Ratio (SINR) are measured to acquire the signal quality of a cell.

Specifically, the first condition in some embodiments of the present disclosure may include any of conditions defined in the events A1 to A6 by NR. That is, the configuration information may be activated by the A1~A6 events. A1~A6 events specifically include the following.

A1 event: a signal quality of a service cell is greater than an absolute threshold.

A2 event: a signal quality of a service cell is less than an absolute threshold.

A3 event: a signal quality of a neighboring cell is one offset greater than a signal quality of the primary cell (PCell) or primary secondary cell (PSCell).

A4 event: a signal quality of a neighboring cell is greater than an absolute threshold.

A5 event: a signal quality of the PCell/PSCell cell is greater than an absolute threshold "1" and a signal quality of a neighboring cell/the secondary cell (SCell) is greater than an absolute threshold "2".

A6 event: a signal quality of a neighboring cell is one offset greater than a signal quality of the SCell.

Here, the thresholds or offsets associated with the A1 to A6 events may be provided via system broadcast information or a dedicated signaling sent from the network side or may be set in the terminal device when the terminal device is provided from the factory, which is not limited in the embodiments of the present disclosure.

In some embodiment, the above second condition may include at least one of the following four conditions. A, a distance from the terminal device to the third cell (i.e., the cell corresponding to the second configuration information) is less than an absolute distance threshold. B, a distance from the terminal device to the service cell is greater than an absolute distance threshold. C, the distance from the terminal device to the third cell is less than an absolute distance threshold "1" and the distance from the terminal device to the service cell is greater than an absolute distance threshold "2". D, the absolute value of the difference between the distance from the terminal device to the third cell and the distance from the terminal device to the service cell is less than an absolute distance threshold.

In some embodiments of the present disclosure, the thresholds associated with the above conditions may be provided by the network device through system information or a dedicated signaling or may be set in the terminal device when the terminal device is provided from the factory, which is not limited in the embodiments of the present disclosure.

In some embodiments, the distance from the terminal device to the corresponding satellite of the third cell and/or the service cell may be calculated by position of the terminal device with the satellite orbit data.

It should be noted that the third condition in some embodiments of the present disclosure is similar to the second condition, which will not be repeated here.

In some embodiments of the present disclosure, the activation condition in the second activation way may be pre-configured by the network side. Specifically, before determining target configuration information from a plurality of pieces of configuration information stored for conditional handover at block 410, the terminal device may also receive first activation configuration information from a third network device. The first activation configuration information is configured to configure the activation condition corresponding to the second configuration information.

Here, the third network device is a network device that configures the second configuration information for the terminal device. The third network device is the same as or different from the first network device, which is not limited in the embodiments of the present disclosure.

In other words, when the network side configures configuration information for the terminal device for conditional handover, it may set an activation condition corresponding to the configuration information to acquire activation configuration information. At the same time, when the network side sends the configuration information for conditional handover to the terminal device, it may send the activation configuration information corresponding to the configuration information to the terminal device.

In some embodiments of the present disclosure, the third network device may carry the first activation configuration information into the RRC connection reconfiguration information and then send to the terminal device.

In this way, the network side may set an activation condition for each configuration information in advance according to the actual network requirements, without having to dynamically indicate the configuration information to be activated to the terminal device in real time, which may reduce system signaling overhead.

Based on the preceding embodiment, in some embodiments of the present disclosure, before determining target configuration information from a plurality of pieces of configuration information stored for conditional handover at block 410, the terminal device may also perform the following operations.

At block 403, the terminal device sends the plurality of pieces of configuration information for conditional handover to a second network device, wherein the second network device is a network device corresponding to a service cell currently accessed by the terminal device.

In some embodiments of the present disclosure, to achieve dynamic activation of the configuration information on the network side, i.e., to achieve the first activation way described above, the terminal device also needs to inform the network device corresponding to the service cell (i.e., the second network device) of the multiple pieces of configuration information currently stored by the terminal device in real time.

Specifically, the terminal device may report the multiple pieces of configuration information stored by itself for conditional handover, to the second network device which is currently accessed. Here, the terminal device may send the list of configuration information shown in Table 1 to the second network device.

In some implementations, the terminal device may send the multiple pieces of configuration information stored for conditional handover to the second network device through RRC signaling.

Specifically, the terminal device may actively report the list of its own stored configuration information through RRC dedicated signaling on the radio. The terminal device may also report the list of its own stored configuration information through RRC uplink private signaling after the second network device sends an RRC downlink private signaling request. This is not limited in the embodiments of the present disclosure.

In another some implementations, the terminal device forwards the plurality of pieces of configuration information for conditional handover to the second network device through the first network device, in response to accessing to the second network device from the first network device. The first network device is a network device corresponding to the first cell.

That is, in the handover process for the terminal device, the network device to which the terminal device currently accesses (i.e., the second network device), receives a list of configuration information stored by the terminal device and sent by a network device corresponding to the last service cell of the terminal device (i.e., the first network device) through a specific interface.

Here, the specific interface may be any one of X2 interface, Xn interface, NG interface, S1 interface, F1 interface, and E1 interface. X2 interface is a communication interface between 4G radio access network nodes. Xn interface is a communication interface between 5G radio access network nodes. S1 interface is a communication interface between the a 4G radio access network node and the 4G core network. NG interface is a communication interface between a 5G radio access network node and the 5G core network. F1 interface is a communication interface between the Central Unit (gNB-CU) and the Distributed Unit (gNB-DU) among the radio access network nodes using the NR system. E1 interface is a communication connection between the Control Plane (gNB-CU-CP) portion of the gNB-CU and the User Plane (gNB-CU-UP) portion of the gNB-CU.

Based on the preceding embodiments, in the method for determining a candidate target cell provided in some embodiments of the present disclosure, the terminal device may further perform the following operations.

At block 430, the terminal device updates the plurality of pieces of configuration information stored for conditional handover.

Here, the update operation may include at least one of a modification operation, an addition operation, and a deletion operation. That is, the terminal device may perform the modification, addition, or deletion operation on the stored configuration information in real time.

Specifically, the terminal device may modify, add or delete on the multiple pieces of configuration information stored in the terminal device according to dynamic indications from the network side. The terminal device may also delete on the multiple pieces of configuration information stored according to a pre-configured deletion condition. This is not limited in the embodiments of the present disclosure.

In some embodiments of the present disclosure, there are various ways to update the stored configuration information for condition handover, two of which are described in detail below.

First Updating Way

In some implementations, updating the plurality of pieces of configuration information stored for conditional handover at block 430 may be achieved by the following operations.

At block 4301, the terminal device receives an update parameter and a third indication information sent by a second network device, wherein the third indication information is configured to indicate the terminal device to update the plurality of pieces of configuration information for conditional handover based on the update parameter;

At block 4302, the terminal device updates the plurality of pieces of configuration information for conditional handover based on the update parameter, and acquiring updated plurality of pieces of configuration information for conditional handover, in response to the third indication information.

That is, the terminal device may receive indication from the second network device corresponding to the current service cell to update the stored plurality of pieces of configuration information.

Here, the third indication information may indicate one or more piece of configuration information of the plurality of pieces of configuration information. The update parameter may include parameters included in modified configuration information or the parameters included in added configuration information.

In some embodiments of the present disclosure, the third indication information may be carried by one of RRC signaling, MAC CE, MAC sub header format, and DCI format.

That is, the network device may indicate the configuration information to be updated by the terminal device through RRC signaling, MAC CE, MAC sub header format, and DCI format.

In some implementations, the third indication information may be carried in a RRC signaling, i.e., the network side indicates the configuration information to be updated by the terminal device through RRC signaling.

Here, the second network device may indicate the configuration information to be updated by the terminal device based on an incremental configuration mode or may indicate the configuration information to be updated by the terminal device based on an index configuration mode.

The incremental configuration mode may be that, if the second network device wants to modify some parameters in one piece of configuration information of the plurality of pieces of configuration information, the second network device updates some parameters in the configuration information in incremental configuration mode, without reassigning all the information in the configuration information. Alternatively, if the second network device only modifies, adds, or deletes configuration information corresponding to a specific cell, it may update the configuration information corresponding to the specific cell in the incremental configuration mode, and the rest of the stored configuration information may continue to be stored and used without being updated.

The index configuration mode may be that, the second network device may modify, add, or delete stored configuration information according to a predetermined mapping relationship. Specifically, the second network device may synthesize update parameters in the configuration information to be updated into a parameter set, use the corner marks shown in Table 1 to identify each update parameter in the parameter set, and use the corner marks to indicate which piece of configuration information among the multiple pieces of configuration information stored by the terminal device the update parameter belongs to.

In this way, after receiving the RRC signaling, the terminal device may find corresponding configuration information based on the corner mark carried in the RRC signaling, and update the configuration information based on the update parameter corresponding to the corner mark in the RRC signaling.

In another some implementations, the third indication information may be carried in a MAC CE or MAC sub header forma. That is, the network side indicates the configuration information to be updated by the terminal device through the MAC CE or MAC sub header format.

Specifically, the MAC CE or MAC sub header format is used to indicate the configuration information to be updated by the terminal device and the update parameter, which may have the following forms.

Form 1A: a bit mapping pattern including multiple bits in the MAC CE or MAC sub header format is used to indicate the configuration information to be updated.

Specifically, similar to a mapping logic of the bit pattern shown in Table 2, a bit corresponds to a piece of configuration information in the list of configuration information. The second network device may set a specific bit in the MAC CE or MAC sub header format, for example, with a value of 0, 1, or a Boolean value, which may indicate deletion of the configuration information corresponding to the bit.

Form 2A: multiple bits in the MAC CE or MAC sub header format are combined to indicate the configuration information to be updated.

Here, the second network device may represent corner mark by a plurality of bits included in the newly defined MAC CE or MAC sub header, e.g., three bits may indicate eight corner marks. In this way, the terminal device may determine corner mark based on the received MAC CE or MAC sub header including a plurality of combined bits, and thus determine to delete the configuration information corresponding to the corner mark.

In yet another some implementations, the third indication information may be carried in the DCI format carried by the PDCCH. That is, the network side indicates the configuration information to be updated by the terminal device through the newly defined DCI format carried by the PDCCH.

Specifically, the DCI format carried by the PDCCH is used to indicate the configuration information to be activated by the terminal device is indicated by, which may have in the following forms.

Form 1B: a bit mapping pattern including a plurality of bits in the DCI format is used to indicate the configuration information to be activated.

Specifically, similar to the bit mapping logic of the bit pattern shown in Table 2, a bit corresponds to a piece of configuration information in the list of configuration information, and the second network device may set a specific bit in the DCI format, for example, with a value of 0, 1, or a Boolean value, to indicate deletion of the configuration information corresponding to the bit.

Form 2B: multiple bits in the DCI format are combined to indicate the configuration information to be activated.

Here, the second network device may represent corner mark by a plurality of bits included in the newly defined DCI carried by the PDCCH. For example, three bits may indicate eight corner marks. In this way, the terminal device may determine corner mark based on the received DCI including a plurality of combined bits, and thus determine to delete the configuration information corresponding to the corner mark.

As it can be seen, in embodiments of the present disclosure, the network side may dynamically update configuration information stored by the terminal device to improve flexibility of cell handover.

Second Updating Way

In some implementations, updating the plurality of pieces of configuration information stored for conditional handover at block 430 may also be achieved by the following operations.

At block 4301, the terminal device monitors a relevant parameter of third configuration information, wherein the third configuration information is any one of the plurality of pieces of configuration information for conditional handover.

At block 4302', the terminal device deletes the third configuration information from the plurality of pieces of configuration information for conditional handover, in response to the relevant parameter of the third configuration information meeting a deletion condition corresponding to the third configuration information.

That is, the terminal device may update the plurality of pieces of configuration information stored by itself according to the pre-configured deletion condition. Here, each configuration information may have its corresponding deletion condition, where a deletion condition corresponding to each configuration information may be configured by the network device, or may be set by the terminal device according to the actual requirements, which is not limited in the embodiments of the present disclosure.

In some embodiments of the present disclosure, the deletion condition includes at least one of a duration during which the third configuration information is received by the terminal device being greater than a second duration; a fifth distance between the terminal device and a cell corresponding to the third configuration information, and/or, a second distance between the terminal device and the service cell currently accessed by the terminal device, meeting a fourth condition; and a sixth distance between the terminal device and a satellite corresponding to a cell corresponding to the third configuration information, and/or, a fourth distance between the terminal device and a satellite corresponding to the service cell currently accessed by the terminal device, meeting a fifth condition.

In some embodiments, for the first item of the above deletion condition, a deletion timer or the second Coordinated Universal Time (UTC) may be configured to detect the duration during which the terminal device receives the third configuration information. The terminal device may delete the third configuration information when the deletion timer times out or the second UTC arrives.

In addition, the second and third item of the above deletion conditions, similar to the implementation of activation conditions in some embodiments of the present disclosure, are not repeated in the embodiments of the present disclosure.

In some embodiments of the present disclosure, the deletion conditions in the second updating way may be pre-configured by the network side. Specifically, before updating the plurality of pieces of configuration information stored for conditional handover at block 430, the following operations may also be performed.

At block 421, the terminal device receives a first deletion configuration information sent by a fourth network device, wherein the first deletion configuration information is configured to configure a deletion condition corresponding to the third configuration information.

Here, the fourth network device is a network device that configures the third configuration information for the terminal device. The fourth network device is the same as, or different from, the first network device, the second network device, and the third network device, which is not limited in the embodiments of the present disclosure.

In other words, when the network side configures configuration information for the terminal device for conditional handover, it may also set a deletion condition corresponding to the configuration information to acquire deletion configuration information. At the same time, when the network side sends the configuration information for conditional handover to the terminal device, it may send the deletion configuration information corresponding to the configuration information to the terminal device.

In some embodiments of the present disclosure, the fourth network device may carry the first deletion configuration information into the RRC connection reconfiguration information and then send to the terminal device.

In this way, the network side may set a deletion condition for each configuration information in advance according to the actual network requirements, and the terminal device will actively delete configuration information when it detects that the configuration information meets the deletion condition, which may save storage space and reduce system signaling overhead.

Some embodiments of the present disclosure provide a method for determining a candidate target cell, which may be applied in the network device 32 in the communication system architecture shown in FIG. 3, i.e., the second network device provided in the above embodiments. That is, the method provided in some embodiments of the present disclosure may be applied in any one of the service cells of the terminal device.

Referring to the flow chart shown in FIG. 6, the method for determining a candidate target cell may include the following operations.

At block 610, the network device sends the first indication information to a terminal device, wherein the first indication information is configured to indicate the terminal device to continue to store one or more pieces of historical configuration information after a successful handover, the one or more pieces of historical configuration information being acquired from any one of historical service cells before handover.

Thus, target configuration information is determined from a plurality of pieces of configuration information stored for conditional handover by the terminal device, wherein the target configuration information includes at least one of a plurality of pieces of historical configuration information; and a cell corresponding to the target configuration information is determined as the candidate target cell in response to a handover condition corresponding to the target configuration information being met. That is, as the target configuration information is determined from the plurality of pieces of configuration information stored for conditional handover, the plurality of pieces of configuration information includes at least one piece of historical configuration information, which is acquired from a historical service cell in response to the terminal device accessing to the historical service cell.

In some embodiments of the present disclosure, the first indication information may be carried in a system broadcast message or dedicated signaling. That is, with first indication information, the network side may indicate the terminal device to continue to store one or more previously stored configuration information for conditional handover after a successful legacy handover or conditional handover. the network side only configures configuration information once, and the terminal device may use historical configuration information, which means that the terminal device does not need to obtain configuration information from the network side before each handover. This saves handover signaling overhead and reduces power consumption of the terminal device.

In some embodiments of the present disclosure, the system broadcast message may be a Master Information Block (MIB) or a System Information Block (SIB). Specifically, the first indication information may be carried via SIB1 or other SIBs (e.g., SIB2~SIB11).

It should be noted that the network device may adopt a mapping image including a bit or multiple bits to indicate the terminal device to continue to save all previously stored configuration information after a successful handover. Specifically, the indications are the same as that described in the above embodiments and will not be repeated here.

Based on the above embodiments, the second network device provided by the present application may also dynamically indicate the terminal device to activate one or more of its stored plurality of pieces of configuration information, causing the terminal device to perform a cell handover based on the activated one or more configuration information.

Specifically, the method for determining a candidate target cell provided in some embodiments of the present disclosure may further include the following operations.

At block 620, the network device sends the second indication information to the terminal device, wherein the second indication information is configured to indicate at least one piece of configuration information in the plurality of pieces of configuration information for conditional handover. Thus, the target configuration information is determined as at least one piece of configuration information indicated by the second indication information by the terminal device, wherein the at least one piece of configuration information includes historical configuration information.

In some embodiments of the present disclosure, the second indication information may be carried in one of Radio Resource Control (RRC) signaling, Media Access Control (MAC) control element (CE), MAC sub header format, and Downlink Control Information (DCI) format.

That is, the second network device may indicate the target configuration information to be activated by the terminal device via RRC signaling, MAC CE, MAC sub header format, and DCI format. Here, the indication is the same as that described in the above-described embodiments, which is not repeated in embodiments of the present disclosure herein.

Based on the above embodiments, in some embodiments of the present disclosure, before sending the second indication information to the terminal device at block 620, the method may further include the following operations.

At block 630, the network device acquires the plurality of pieces of configuration information stored by the terminal device for conditional handover.

In some implementations, the second network device may receive the plurality of pieces of configuration information for the conditional handover actively reported by the terminal device through RRC dedicated signaling. The second network device may also receive the list of configuration information stored by the terminal device itself reported through RRC uplink private signaling after the second network device sends an RRC downlink private signaling request.

In some implementations, the second network device may receive a plurality of pieces of configuration information forwarded by the first network device for conditional handover during which the terminal device is handed-over from the first network device to the second network device.

That is, in the handover process for the terminal device, the network device to which the terminal device currently accesses (i.e., the second network device), receives a list of configuration information stored by the terminal device and sent by a network device corresponding to the last service cell of the terminal device (i.e., the first network device) through a specific interface.

Here, the specific interface has been described in detail in the above embodiments, which is not repeated in embodiments of the present disclosure herein.

In some embodiments, the second network device may also dynamically indicate the terminal device to update the plurality of pieces of configuration information stored by itself. Specifically, the method for determining a candidate target cell provided by embodiments of the present disclosure may further include the following operations.

At block 640, the network device sends an update parameter and third indication information to the terminal device, wherein the third indication information is configured to indicate the terminal device to update the plurality of pieces of configuration information for conditional handover based on the update parameter.

Here, the update operation may include at least one of a modification operation, an addition operation, and a deletion operation. That is, the second network device may indicate the terminal device may perform the modification, addition, or deletion operation on the stored configuration information.

Here, the third indication information may indicate one or more piece of configuration information of the plurality of pieces of configuration information. The update parameter may include parameters included in modified configuration information or the parameters included in added configuration information.

In some embodiments of the present disclosure, the third indication information may be carried by one of RRC signaling, MAC CE, MAC sub header format, and DCI format.

That is, the second network device may indicate the configuration information to be updated by the terminal device through RRC signaling, MAC CE, MAC sub header format, and DCI format. The specific indication herein is the same as that described in the above embodiments, which is not repeated in embodiments of the present disclosure herein.

In some embodiment, the method for determining the candidate target cell provided in some embodiments of the present disclosure may further include the following operations.

At block 650, the network device sends to-be-stored configuration information for the conditional handover, and second activation configuration information and/or second deletion configuration information corresponding to the to-be-stored configuration information, to the terminal device.

The second activation configuration information is configured to configure an activation condition corresponding to the to-be-stored configuration information; and the second deletion configuration information is configured to configure a deletion condition corresponding to the to-be-stored configuration information.

That is, when the second network device sends the to-be-stored configuration information to the terminal device, it may set the corresponding activation condition and deletion condition for the to-be-stored configuration information.

After the terminal device receives the to-be-stored configuration information, it may store the to-be-stored configuration information into the list of configuration information and store the activation condition and deletion condition corresponding to the to-be-stored configuration information.

In some embodiments of the present disclosure, the activation condition corresponding to the to-be-stored configuration information at least includes that a duration during which the to-be-stored configuration information is received by the terminal device being greater than a third duration. The deletion condition corresponding to the to-be-stored configuration information at least includes that a duration during which the to-be-stored configuration information is received by the terminal device being greater than a fourth duration.

The third duration is configured to indicate a length of time from which the terminal device receives the to-be-stored configuration information to which the to-be-stored configuration information is activated, and the fourth duration is configured to indicate a length of time from which the terminal device receives the to-be-stored configuration information to which the to-be-stored configuration information is deleted.

In some embodiments of the present disclosure, the third duration included in the activation condition of the to-be-stored configuration information, and the fourth duration included in the deletion condition of the to-be-stored configuration information, may be configured in different ways.

Specifically, in some implementations, before sending to-be-stored configuration information for the conditional handover and a second activation configuration information and/or a second deletion configuration information corresponding to the to-be-stored configuration information to the terminal device at block 650, the method may further include the following operations.

Operation A, the method sends a first request message to a fifth network device, wherein the first request message is configured to request the to-be-stored configuration information.

Operation B, the method receives the to-be-stored configuration information sent by the fifth network device, and determines the third duration and/or the fourth duration based on location information of the terminal device.

Operation C, the method acquires the second activation configuration information based on the third duration; and/or, Operation D, the method acquires the second deletion configuration information based on the fourth duration.

In some embodiments of the present disclosure, the second network device may send a handover request to the fifth network device, and the fifth network device may reserve certain resources for the terminal device based on the handover request, generate and send configuration information to be stored to the second network device.

In this way, when forwarding the to-be-stored configuration information generated by the fifth network device to the terminal device, the second network device may estimate a distance between the fifth network device and the terminal device to determine the third duration and/or the fourth duration based on the location information of the terminal device and to set the second activation configuration information and the second deletion configuration information for the to-be-stored configuration information.

Here, the location information of the terminal device may be the accurate geographic location information of the terminal device, or fuzzed location information from the accurate geographic location information. The location information of the terminal device may also be a Cell Global Identity (CGI) a Tracking Area Code (TAC), and Tracking Area Identity (TAI) information of the current service cell of the terminal device.

In some implementations, the second network device may set an activation timer or a third UTC to configure the third duration, and set a deletion timer or a fourth UTC to configure the fourth duration. Specifically, when forwarding the to-be-stored configuration information generated by the fifth network device, the second network device may add an activation timer or a third UTC, and a deletion timer or a fourth UTC for the to-be-stored configuration information in the RRC reassignment information on the radio.

Specifically, in some implementations, before sending to-be-stored configuration information for conditional handover and a second activation configuration information and/or a second deletion configuration information corresponding to the to-be-stored configuration information to the terminal device at block 640, the method may further include the following operations.

Operation A', the method sends a second request message to the fifth network device, wherein the second request message is configured to request the to-be-stored configuration information, and the second request message includes the location information of the terminal device.

Operation B', the method receives the to-be-stored configuration information sent by the fifth network device, and the third duration and/or the fourth duration determined by the fifth network device based on the location information of the terminal device.

Operation C', the method acquires the second activation configuration information based on the third duration; and/or, the method acquires the second deletion configuration information based on the fourth duration.

It is understood that the second network device may send a handover request to the fifth network device and carry the location information of the terminal device in the handover request.

The fifth network device generates the to-be-stored configuration information in response to the handover request, while the fifth network device may configure the third duration and the fourth duration based on the location information of the terminal device. Finally, the fifth network device may send the to-be-stored configuration information, as well as the third duration and the fourth duration, to the second network device.

In this way, the second network device may configure the second activation configuration information for the terminal device based on the third duration and the second deletion configuration information for the terminal device based on the fourth duration.

In some implementations, the fifth network device may set an activation timer or a third UTC to configure the third duration, and set a deletion timer or a fourth UTC to configure the fourth duration.

It should be noted that in the above implementations, the fifth network device allocates actual transmission resources for the terminal device only if a duration during which the terminal device receives to-be-stored configuration information is greater than the third duration and less than the fourth duration. Therefore, the fifth network device will not allocate resources for the terminal device when the duration during which the terminal device receives to-be-stored configuration information is less than the third duration and greater than the fourth duration. Thus, resource utilization of the network side may be improved.

In some embodiments of the present disclosure, there is also provided an apparatus for determining a candidate target cell, which may be applied in the terminal device described above, as shown in FIG. 7, the apparatus includes: a first determining unit, configured to determine target configuration information from multiple pieces of configuration information stored for conditional handover, wherein the target configuration information includes at least one of multiple pieces of historical configuration information; the at least one piece of historical configuration information includes one or more pieces of first configuration information acquired from a first cell in response to the terminal device accessing to the first cell; the first cell is a historical service cell for the terminal device; and a first processing unit, configured to determine a cell corresponding to the target configuration information as the candidate target cell in response to a handover condition corresponding to the target configuration information being met. That is, as the target configuration information is determined from the plurality of pieces of configuration information stored for conditional handover, the plurality of pieces of configuration information includes at least one piece of historical configuration information, which is acquired from a historical service cell in response to the terminal device accessing to the historical service cell.

In some implementations, the device may further include a first receiving unit.

The first receiving unit is configured to receive first indication information, wherein the first indication information is configured to indicate the terminal device to continue to store one or more pieces of historical configuration information after a successful handover, the one or more pieces of historical configuration information being acquired from any one of the historical service cells before handover.

In some implementations, the first indication information is carried by a system broadcast message or dedicated signaling.

In some implementations, the first receiving unit is further configured to receive and store one or more pieces of the first configuration information for conditional handover sent by a first network device corresponding to the first cell in response to the terminal device accessing to the first cell.

The first processing unit 72 is further configured to handover from the first cell to a second cell corresponding to target first configuration information of the one or more pieces of first configuration information, in response to a handover condition indicated by the target first configuration information being met, wherein the second cell is a service cell currently accessed by the terminal device. In other word, the first receiving unit receives and stores at least one piece of historical configuration information for conditional handover sent by the first network device, in response to the terminal device accessing to a historical service cell corresponding to the at least one piece of historical configuration information, and the first processing unit 72 handovers from the historical service cell to the service cell currently accessed by the terminal device, in response to a handover condition indicated by the target first configuration information being met.

In some implementations, the first receiving unit is configured to receive second indication information sent by a second network device, wherein the second indication information is configured to indicate at least one piece of configuration information in the plurality of pieces of configuration information for conditional handover; the at least one piece of configuration information includes historical configuration information, and the second network device is a network device corresponding to a service cell currently accessed by the terminal device.

The first determining unit 71 is configured to determine at least one piece of configuration information indicated by the second indication information as the target configuration information.

In some implementations, the second indication information is carried by one of Radio Resource Control (RRC) signaling, Media Access Control (MAC) control element (CE), MAC sub header format, and Downlink Control Information (DCI) format.

In some implementations, the first determining unit 71 is configured to monitor a relevant parameter of second configuration information, wherein the second configuration information is any one of the plurality of pieces of configuration information for conditional handover; and determine the second configuration information as the target configuration information, in response to the relevant parameter of the second configuration information meeting an activation condition corresponding to the second configuration information.

In some implementations, the activation condition corresponding to the second configuration information includes at least one of the following:

a duration during which the second configuration information is received by the terminal device being greater than a first duration;

a signal quality of a service cell currently accessed by the terminal device, and/or, a signal quality of a third cell, meeting a first condition, the third cell corresponding to the second configuration information; a first distance between the terminal device and the third cell, and/or, a second distance between the terminal device and the service cell currently accessed by the terminal device, meeting a second condition;

a third distance between the terminal device and a satellite corresponding to the third cell, and/or, a fourth distance between the terminal device and a satellite corresponding to the service cell currently accessed by the terminal device, meeting a third condition.

In some implementations, the first receiving unit is further configured to receive first activation configuration information from a third network device, wherein the first activation configuration information is configured to configure the activation condition corresponding to the second configuration information.

In some implementations, the apparatus further includes a first sending unit. The sending unit configured to send the plurality of pieces of configuration information for conditional handover to a second network device, wherein the second network device is a network device corresponding to a service cell currently accessed by the terminal device.

In some implementations, the first sending unit is configured to send the plurality of pieces of configuration information for conditional handover to the second network device through RRC signaling.

In some implementations, the first sending unit is configured to forward the plurality of pieces of configuration information for conditional handover to the second network device through the first network device, in response to accessing to the second network device from the first network device, wherein the first network device is a network device corresponding to the first cell.

In some implementations, the first processing unit 72 is configured to update the plurality of pieces of configuration information stored for conditional handover.

In some implementations, the first receiving unit is further configured to receive an update parameter and third indication information sent by a second network device, wherein the third indication information is configured to indicate the terminal device to update the plurality of pieces of configuration information for conditional handover based on the update parameter.

The first processing unit 72 is configured to update the plurality of pieces of configuration information for conditional handover based on the update parameter and acquire updated pieces of configuration information for conditional handover, in response to the third indication information.

In some implementations, the third indication information is carried in one of Resource Control (RRC) signaling, Media Access Control (MAC) control element (CE), MAC sub header format, and Downlink Control Information (DCI) format.

In some implementations, the first processing unit 72 is configured to monitor a relevant parameter of third configuration information, wherein the third configuration information is any one of the plurality of pieces of configuration information for conditional handover; and delete the third configuration information from the plurality of pieces of configuration information for conditional handover, in response to the relevant parameter of the third configuration information meeting a deletion condition corresponding to the third configuration information.

In some implementations, the deletion condition includes at least one of the following:

a duration during which the third configuration information is received by the terminal device being greater than a second duration;

a fifth distance between the terminal device and the cell corresponding to the third configuration information, and/or, a second distance between the terminal device and the service cell currently accessed by the terminal device meeting a fourth condition;

a sixth distance between the terminal device and a satellite corresponding to the cell of the third configuration information, and/or, a fourth distance between the terminal device and a satellite corresponding to the service cell currently accessed by the terminal device meeting a fifth condition.

In some implementations, the first receiving unit is configured to receive a first deletion configuration information sent by a fourth network device, wherein the first deletion configuration information is configured to configure a deletion condition corresponding to the third configuration information.

It is to be noted that the functional units in the embodiments may be integrated into a processing module, or the individual units may physically exist separately, or two or more units may be integrated into a single module. The above-integrated module may be implemented either in the form of hardware or in the form of a software functional module.

The integrated module, when implemented in the form of a software functional module and not sold or used as a separate product, may be stored in a computer readable storage medium. Based on the understanding that the technical solution of the present embodiment essentially or the part that contributes to the prior art or all or part of the technical solution may be embodied in the form of a software product. The computer software product is stored in a storage medium, including several instructions to enable a computer device (which may be a personal computer, server, or network device, etc.) or processor (processor) to perform all or some of the steps of the method of the embodiments. The aforementioned storage media include USB flash drive, mobile hard disk, Read Only Memory (ROM), Random Access Memory (RAM), disk or CD-ROM, and other media that may store program code.

Based on the preceding embodiment, in some implementations of the present disclosure a terminal device is also provided. As shown in FIG. 8, the terminal device provided in some implementations of the present disclosure may include a first transceiver 801, a first processor 802, a first memory 803 storing executable instructions of the first processor.

The first transceiver 801, the first processor 802 and the first memory 803 communicate with each other through a communication bus 804.

The first processor 802 is used for running a computer program stored in the first memory 803, may execute:

determining target configuration information from a plurality of pieces of configuration information stored for conditional handover, wherein the plurality of pieces of configuration information comprises at least one piece of historical configuration information, which is acquired from a historical service cell in response to the terminal device accessing to the historical service cell;

determining a cell corresponding to the target configuration information as the candidate target cell, in response to a handover condition corresponding to the target configuration information being met.

In some implementations of the present disclosure, there is also provided an apparatus for determining a candidate target cell, which may be applied in the second network device described above. As shown in FIG. 9, the apparatus includes: a second sending unit 91 configured to send first indication information to a terminal device, wherein the first indication information is configured to indicate the terminal device to continue to store one or more pieces of historical configuration information after a successful handover, the one or more pieces of historical configuration information being acquired from any one of historical service cells before handover.

Thus, target configuration information is determined from multiple pieces of configuration information stored for conditional handover by the terminal device, wherein the target configuration information comprises at least one of multiple pieces of historical configuration information; and a cell corresponding to the target configuration information is determined as the candidate target cell in response to a handover conditions corresponding to the target configuration information being met.

In some implementations, the second sending unit 91 is further configured to send second indication information to the terminal device, wherein the second indication information is configured to indicate at least one piece of configuration information of the plurality of pieces of configuration information for conditional handover, and the at least one piece of configuration information indicated by the second indication information is determined as the target configuration information by the terminal device, wherein the at least one piece of configuration information comprises historical configuration information.

In some implementations, the device further includes a second receiving unit.

The second receiving unit is configured to acquire the plurality of pieces of configuration information stored by the terminal device for conditional handover.

In some implementations, the second receiving unit is configured to receive the plurality of pieces of configuration information for conditional handover sent by the terminal device through RRC signaling.

In some implementations, the second receiving unit is configured to receive the plurality of pieces of configuration information for conditional handover forwarded by a first network device, in response to the terminal device accessing to the second network device from the first network device.

In some implementations, the second sending unit 91 is configured to send an update parameter and the third indication information to the terminal device, wherein the third indication information is configured to indicate the terminal device to update the plurality of pieces of configuration information for conditional handover based on the update parameter.

In some implementations, the second sending unit 91 is configured to send to-be-stored configuration information for the conditional handover and a second activation configuration information and/or a second deletion configuration information corresponding to the to-be-stored configuration information to the terminal device.

The second activation configuration information is configured to configure an activation condition corresponding to the to-be-stored configuration information; and the second deletion configuration information is configured to configure a deletion condition corresponding to the to-be-stored configuration information.

In some implementations, the activation condition corresponding to the to-be-stored configuration information, at least includes: a duration during which the to-be-stored configuration information is received by the terminal device being greater than a third duration; the deletion condition corresponding to the to-be-stored configuration information at least includes: a duration during which the to-be-stored configuration information is received by the terminal device greater than a fourth duration.

In some implementations, the apparatus further includes a third sending unit, a third receiving unit, a second determining unit, and a second processing unit.

The third sending unit is configured to send a first request message to a fifth network device, wherein the first request message is configured to request the to-be-stored configuration information;

The third receiving unit is configured to receive the to-be-stored configuration information sent by the fifth network device;

The second determining unit is configured to determine the third duration and/or the fourth duration based on the location information of the terminal device;

The second processing unit is configured to acquire the second activation configuration information based on the third duration; and/or, acquire the second deletion configuration information based on the fourth duration.

In some implementations, the third sending unit is configured to send a second request message to the fifth network device, wherein the second request message is configured to request the to-be-stored configuration information, and the second request message includes the location information of the terminal device.

The third receiving unit is configured to receive the to-be-stored configuration information sent by the fifth network device, and the third duration and/or the fourth duration determined by the fifth network device based on the location information of the terminal device.

The second processing unit is configured to acquire the second activation configuration information based on the third duration; and/or acquire the second deletion configuration information based on the fourth duration.

It is to be noted that each functional unit in this embodiment may be integrated into a processing module, or each unit may be physically present separately, or two or more units may be integrated into a single module. The above-integrated module may be implemented either in the form of hardware or in the form of a software functional module.

The integrated module, when implemented in the form of a software functional module and not sold or used as a separate product, may be stored in a computer readable storage medium. Based on the understanding that the technical solution of the present embodiment essentially or the part that contributes to the prior art or all or part of the technical solution may be embodied in the form of a software product. The computer software product is stored in a storage medium, including several instructions to enable a computer device (which may be a personal computer, server, or network device, etc.) or processor (processor) to perform all or some of the steps of the method of the embodiments. The aforementioned storage media include USB flash drive, mobile hard disk, Read Only Memory (ROM), Random Access Memory (RAM), disk or CD-ROM, and other media that may store program code.

Figure 10:
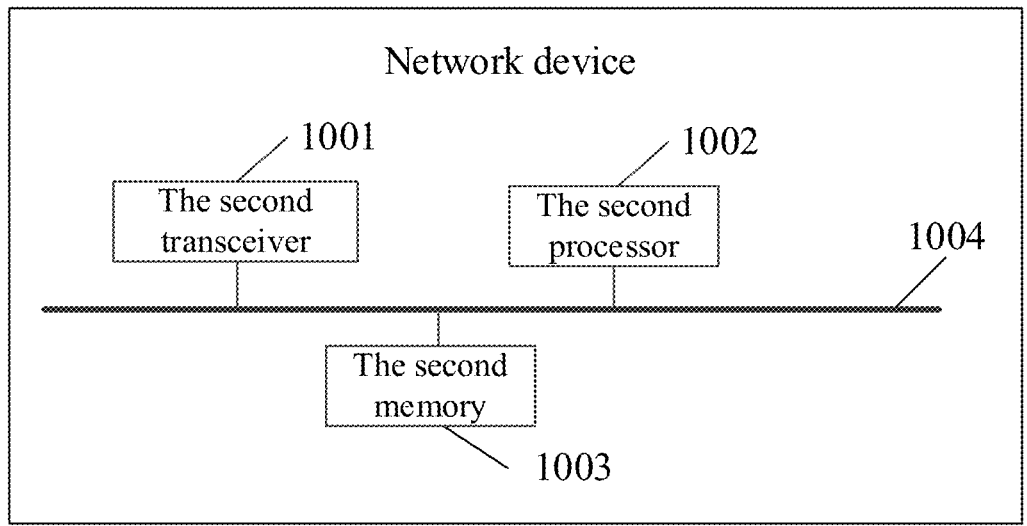
FIG. 10 is a hardware structural composition schematic of a network device provided in some embodiment of the present disclosure.

Based on the preceding embodiment, in some implementations of the present disclosure, a network device is also provided. As shown in FIG. 10, the network device provided in some implementations of the present disclosure may include a second transceiver 1001, a second processor 1002, and a second memory 1003 storing executable instructions of the second processor.

The second transceiver 1001, the second processor 1002 and the second memory 1003 communicate with each other through a communication bus 1004.

The second transceiver 1001 is used for running a computer program stored in the second memory 1003, may execute: sending first indication information to a terminal device, wherein the first indication information is configured to indicate the terminal device to continue to store at least one piece of historical configuration information after a successful handover, the at least one piece of historical configuration information being acquired from a historical service cell; wherein target configuration information is determined from a plurality of pieces of configuration information stored for conditional handover by the terminal device, wherein the plurality of pieces of configuration information comprises the at least one piece of historical configuration information, which is acquired from the historical service cell in response to the terminal device accessing to the historical service cell; and a cell corresponding to the target configuration information is determined as the candidate target cell in response to a handover condition corresponding to the target configuration information being met.

It should be understood that the memory in this embodiment may be a volatile memory or non-volatile memory or may include both volatile and non-volatile memory. Among them, the non-volatile memory may be Read Only Memory (ROM), Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, Magnetic Surface Memory, CD-ROM, or Compact Disc Read-Only Memory (CD-ROM); magnetic surface memory may be disk memory or magnetic tape memory. Volatile memory may be Random Access Memory (RAM), which is used as an external cache. By way of illustration, but not limitation, many forms of RAM are available, such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (SDRAM), Double Data Rate Synchronous Dynamic Random Access Memory (DDRSDRAM), Enhanced Synchronous Dynamic Random Access Memory (ESDRAM), Synchronous Link Dynamic Random Access Memory (SLDRAM), and Direct Rambus Random Access Memory (DRRAM). The memories described in this application embodiment are intended to include but are not limited to, these and any other suitable types of memories.

Some embodiments of the present disclosure also provide a computer storage medium, specifically a computer readable storage medium. Computer instructions are stored thereon which, as a first embodiment, perform any of the steps in the candidate target cell determination method described above in embodiments of the present disclosure when the computer instructions are executed by a processor, while the computer storage medium is arranged in a terminal.

It should be understood that in the various embodiments of the present disclosure, the size of the serial number of each of the above processes does not imply the order of execution, and the order of execution of each process shall be determined by its function and intrinsic logic, and shall not constitute any limitation to the processes implemented in the embodiments of the present disclosure.

The skilled in the art may realize that the units and algorithmic steps of each example described in conjunction with the embodiments disclosed herein are capable of being implemented with electronic hardware, or a combination of computer software and electronic hardware. Whether these functions are performed in hardware or software depends on the particular application and design constraints of the technical solution. The skilled may use different methods to implement the described functions for each particular application, but such embodiments should not be considered outside the scope of the present disclosure.

The described functionality, when implemented as a software functional unit and sold or used as a stand-alone product, may be stored in a computer readable storage medium. It is understood that the technical solution of the present application, or the part of the technical solution that essentially contributes to the prior art, may be embodied in the form of a software product that is stored in a storage medium and includes several instructions to cause a computer device (which may be a personal computer, a server, or a network device, etc.) to perform all or some of the steps of the method described in various embodiments of the present application. All or some of the steps of the method are described in each embodiment of the present application. The aforementioned storage media include USB flash drive, removable hard disk, Read-Only Memory (ROM), Random Access Memory (RAM), disk or CD-ROM, and other media that may store program code.

The above-mentioned are only specific embodiments of the present disclosure, but the scope of protection of this application is not limited to this, and any skilled in the art may easily think of variations or substitutions within the technical scope disclosed in this application, which should be covered by the scope of protection of this application. Therefore, the scope of protection of this application shall be subject to the scope of protection of the stated claims.

What is claimed is:

1. A method for determining a candidate target cell, applied in a terminal device, comprising:
  determining target configuration information from a plurality of pieces of configuration information stored for conditional handover, wherein the plurality of pieces of configuration information comprises at least one piece of historical configuration information, which is acquired from a historical service cell in response to the terminal device accessing to the historical service cell;
  determining a cell corresponding to the target configuration information as the candidate target cell, in response to a handover condition corresponding to the target configuration information being met;
wherein the method further comprises:
  updating the plurality of pieces of configuration information stored for conditional handover;
wherein the updating the plurality of pieces of configuration information stored for conditional handover, comprises:
  monitoring a relevant parameter of third configuration information, wherein the third configuration information is any one of the plurality of pieces of configuration information for conditional handover; and
  deleting the third configuration information from the plurality of pieces of configuration information for conditional handover, in response to the relevant parameter of the third configuration information meeting a deletion condition corresponding to the third configuration information.

2. The method as claimed in claim 1, wherein before the determining target configuration information from a plurality of pieces of configuration information stored for conditional handover, the method further comprises:
  receiving first indication information, wherein the first indication information is configured to indicate the terminal device to continue to store the at least one piece of historical configuration information after a successful handover.

3. The method as claimed in claim 2, wherein the first indication information is carried by a system broadcast message or dedicated signaling.

4. The method as claimed in claim 1, wherein before the determining target configuration information from a plurality of pieces of configuration information stored for conditional handover, the method comprises:
  receiving and storing the at least one piece of historical configuration information for conditional handover sent by a first network device, in response to the terminal device accessing to the historical service cell;
  handing-over from the historical service cell to a service cell currently accessed by the terminal device, in response to a handover condition indicated by the target first configuration information being met.

5. The method as claimed in claim 1, wherein the determining target configuration information from a plurality of pieces of configuration information stored for conditional handover comprises:

receiving second indication information sent by a second network device, wherein the second indication information is configured to indicate at least one piece of configuration information of the plurality of pieces of configuration information for conditional handover; the at least one piece of configuration information comprises historical configuration information, and the second network device is a network device corresponding to a service cell currently accessed by the terminal device;

determining the at least one piece of configuration information indicated by the second indication information as the target configuration information.

6. The method as claimed in claim 5, wherein the second indication information is carried by one of a Radio Resource Control (RRC) signaling, a Media Access Control (MAC) control element (CE), a MAC sub header format, and a Downlink Control Information (DCI) format.

7. The method as claimed in claim 1, wherein the determining target configuration information from a plurality of pieces of configuration information stored for conditional handover comprises:

monitoring a relevant parameter of second configuration information, wherein the second configuration information is any one of the plurality of pieces of configuration information for conditional handover;

determining the second configuration information as the target configuration information, in response to the relevant parameter of the second configuration information meeting an activation condition corresponding to the second configuration information.

8. The method as claimed in claim 7, wherein the activation condition corresponding to the second configuration information comprises at least one of:

a duration during which the second configuration information is received by the terminal device being greater than a first duration;

a signal quality of a service cell currently accessed by the terminal device, and/or, a signal quality of a third cell, meeting a first condition, the third cell corresponding to the second configuration information;

a first distance between the terminal device and the third cell, and/or, a second distance between the terminal device and the service cell currently accessed by the terminal device, meeting a second condition;

a third distance between the terminal device and a satellite corresponding to the third cell, and/or, a fourth distance between the terminal device and a satellite corresponding to the service cell currently accessed by the terminal device, meeting a third condition.

9. The method as claimed in claim 7, wherein before the determining target configuration information from a plurality of pieces of configuration information stored for conditional handover, the method comprises:

receiving first activation configuration information from a third network device, wherein the first activation configuration information is configured to configure the activation condition corresponding to the second configuration information.

10. The method as claimed in claim 1, wherein before the determining target configuration information from a plurality of pieces of configuration information stored for conditional handover, the method further comprises:

sending the plurality of pieces of configuration information for conditional handover to a second network device, wherein the second network device is a network device corresponding to a service cell currently accessed by the terminal device.

11. The method as claimed in claim 10, wherein the sending the plurality of pieces of configuration information for conditional handover to a second network device comprises:

sending the plurality of pieces of configuration information for conditional handover to the second network device through an RRC signaling.

12. The method as claimed in claim 10, wherein the sending the plurality of pieces of configuration information for conditional handover to a second network device, comprises:

forwarding the plurality of pieces of configuration information for conditional handover to the second network device through the first network device, in response to accessing to the second network device from the first network device, wherein the first network device is a network device corresponding to the first cell.

13. The method as claimed in claim 1, wherein the updating the plurality of pieces of configuration information stored for conditional handover, further comprises:

receiving an update parameter and a third indication information sent by a second network device, wherein the third indication information is configured to indicate the terminal device to update the plurality of pieces of configuration information for conditional handover based on the update parameter;

updating the plurality of pieces of configuration information for conditional handover based on the update parameter, and acquiring updated pieces of configuration information for conditional handover, in response to the third indication information.

14. The method as claimed in claim 13, wherein the third indication information is carried by one of a Resource Control (RRC) signaling, a Media Access Control (MAC) control element (CE), a MAC sub header format, and a Downlink Control Information (DCI) format.

15. The method as claimed in claim 1, wherein the deletion condition comprises at least one of:

a duration during which the third configuration information is received by the terminal device being greater than a second duration;

a fifth distance between the terminal device and a cell corresponding to the third configuration information, and/or, a second distance between the terminal device and the service cell currently accessed by the terminal device, meeting a fourth condition;

a sixth distance between the terminal device and a satellite corresponding to the cell corresponding to the third configuration information, and/or, a fourth distance between the terminal device and a satellite corresponding to the service cell currently accessed by the terminal device, meeting a fifth condition.

16. The method as claimed in claim 1, wherein before the updating the plurality of pieces of configuration information stored for conditional handover, the method further comprises:

receiving a first deletion configuration information sent by a fourth network device, wherein the first deletion configuration information is configured to configure the deletion condition corresponding to the third configuration information.

17. A method for determining a candidate target cell, applied in a second network device, comprising:

sending first indication information to a terminal device, wherein the first indication information is configured to indicate the terminal device to continue to store at least one piece of historical configuration information after a successful handover, the at least one piece of historical configuration information being acquired from a historical service cell;

wherein target configuration information is determined from a plurality of pieces of configuration information stored for conditional handover by the terminal device, wherein the plurality of pieces of configuration information comprises the at least one piece of historical configuration information, which is acquired from the historical service cell in response to the terminal device accessing to the historical service cell; a cell corresponding to the target configuration information is determined as the candidate target cell in response to a handover condition corresponding to the target configuration information being met; a relevant parameter of third configuration information is monitored by the terminal device, wherein the third configuration information is any one of the plurality of pieces of configuration information for conditional handover; and the relevant parameter of third configuration information is deleted from the plurality of pieces of configuration information for conditional handover, in response to the relevant parameter of the third configuration information meeting a deletion condition corresponding to the third configuration information.

18. A terminal device, comprising a first transceiver, a first processor, and a first memory storing a computer program, wherein the first transceiver, the first processor, and the first memory are communicated with each other through a first communication bus;

the first processor is configured to communicated with a network device through the first transceiver;

the first processor is further configured to perform a method for determining a candidate target cell in conjunction with the first transceiver, when running the computer program stored in the first memory; and the method comprises:

determining target configuration information from a plurality of pieces of configuration information stored for conditional handover, wherein the plurality of pieces of configuration information comprises at least one piece of historical configuration information, which is acquired from a historical service cell in response to the terminal device accessing to the historical service cell;

determining a cell corresponding to the target configuration information as the candidate target cell, in response to a handover condition corresponding to the target configuration information being met;

wherein the method further comprises:

updating the plurality of pieces of configuration information stored for conditional handover:

wherein the updating the plurality of pieces of configuration information stored for conditional handover, comprises:

monitoring a relevant parameter of third configuration information, wherein the third configuration information is any one of the plurality of pieces of configuration information for conditional handover; and deleting the third configuration information from the plurality of pieces of configuration information for conditional handover in response to the relevant parameter of the third configuration information meeting a deletion condition corresponding to the third configuration information.

19. The terminal device as claimed in claim 18, wherein before the determining target configuration information from a plurality of pieces of configuration information stored for conditional handover, the method performed by the first processor further comprises:

receiving first indication information, wherein the first indication information is configured to indicate the terminal device to continue to store the at least one piece of historical configuration information after a successful handover.

20. The terminal device as claimed in claim 18, wherein the first indication information is carried by a system broadcast message or dedicated signaling.

* * * * *